WALTER J. BROWN
INVENTOR

BY *James B. Grant*
ATTORNEY

INVENTOR
WALTER J BROWN
BY
ATTORNEY

WALTER J. BROWN
INVENTOR

BY James B. Grant
ATTORNEY

United States Patent Office

2,799,818
Patented July 16, 1957

2,799,818

ELECTRICAL CONTROL SYSTEMS FOR ADJUSTING AND CONTROLLING THE SPEED OF A SERIES WOUND ELECTRIC MOTOR

Walter J. Brown, Stamford, Conn.

Application May 1, 1953, Serial No. 352,429

12 Claims. (Cl. 318—245)

This invention relates in general to electric drives including electrical control systems for adjusting and/or controllable electric converter, and more particularly to such systems in which the converter comprises one or more space discharge devices or rotating electrical machines having an output which is controllable by means of a relatively small signal voltage applied to control terminals of the converter.

One object of the invention is to provide a simple control system which permits the use of a single converter for supplying both the armature and field of the motor.

Another object of the invention is to provide a wide range of control of both the armature and field voltages and thus to enable the motor speed to be adjusted over a wide range.

Another object of the invention is to provide such a system which enables the speed of the motor to be controlled so as to remain susbtantially constant at a selected value irrespective of fluctuations in the load on the motor.

Another object of the invention is to control the output of the converter by a quantity which is dependent on the ratio between the voltage across the armature winding and the current in the field winding, thus tending to maintain constant speed irrespective of load changes.

Another object of the invention is to control the output of the converter by a quantity which is dependent on the ratio between the armature voltage and a non-rectilinear (hereinafter referred to as "non-linear") function of the field current, thus tending to maintain constant speed in spite of magnetic saturation in the motor.

The parent application Serial Number 222,378, filed April 23, 1951, now Patent No. 2,733,395, of which this application is a continuation in part and a continuing application Serial No. 352,428, now Patent No. 2,777,106 filed with this application, describe systems for adjusting or controlling a series wound electric motor supplied from a controllable converter, in which the output of the converter is controlled by a quantity dependent upon the relation between the voltage across the motor armature and the voltage across a motor series field winding. Arrangements are also described, in the parent application, for deriving a feedback voltage ($E_x$) which is approximately proportional to the motor field flux, by means of two serially connected resistive elements having different voltage coefficients of resistance. By suitable adjustment this will compensate for the non-linear relation of field flux to field voltage which is caused by magnetic saturation, and thus maintain substantially constant motor speed regardless of load (under steady state conditions). It is explained in that application, that the system may be unstable when the motor has a highly inductive field winding, due to the fact that a sudden change in motor current will induce a transient voltage across the field winding and will temporarily disturb the ratio of field voltage to armature voltage. It is also explained therein that in such instances it has been found that the stability may be improved by connecting a resistor in parallel with the field winding.

Alternative methods will now be described for improving the stability of the system in one or more of the following ways:

(1) By including in the motor circuit a resistor which is connected in series with the armature and field windings and by deirivng a feedback voltage from the voltage across said series resistor. This provides a feedback voltage which is directly dependent on the field current which is in turn dependent on the field voltage, both as regards the magnitude and the time integral of said field voltage.

The time integral" of the field voltage may be defined as follows:

Let $L$=inductance of field winding, and $R$=resistance of field windings.

Let $E$=instantaneous voltage applied across the winding, and

Let $i$=instantaneous current in the winding.

Let $t$=time.

The following equations will be found in "Infinitesimal Calculus," Horace Lamb, University Press, 1919, page 392, with some differences in terminology:

$$\text{Equation (17)} \quad E = R \cdot i + L \cdot \frac{di}{dt}$$

This is a differential equation, and if E is constant its solution is:

$$(18) \quad i = \frac{E}{R} + K \cdot \epsilon^{-\frac{Rt}{L}}$$

where K is an arbitrary constant.

If the voltage E is applied by completing the circuit at time $t=0$, the solution is:

$$(19) \quad i = \frac{E}{R} - \frac{E}{R} \cdot \epsilon^{-\frac{Rt}{L}}$$

The first term on the right side, Equation 19, is the steady-state component of $i$, which is dependent on the magnitude of the voltage E; the second term is the transient component which is dependent upon the "time integral" as well as the magnitude of E. Therefore, the total instantaneous field current $i$ is dependent upon the magnitude and time integral of the field voltage E.

(2) By coupling into the motor circuit other current sensitive elements for deriving a feedback voltage which is dependent on the field current.

The arrangements in the parent application, in the continuing application filed with this application, and the several circuit arrangements incorporating the improvements will now be described as follows:

Figure 8 illustrates an alternative to the arrangement shown in Figure 2.

Figure 9 illustrates a modification of the arrangement shown in Figure 1.

Figure 1:
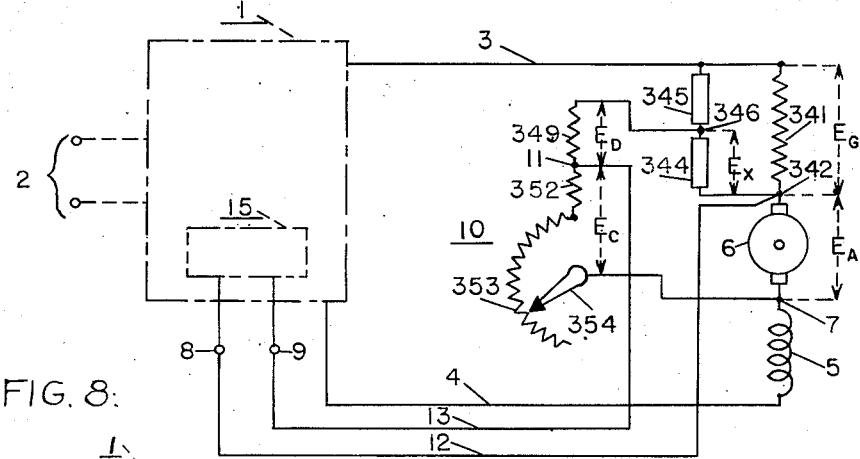
Figure 1 illustrates a form of the invention in which a resistor is connected in series with the armature and field windings.

Figure 1 shows an arrangement in which a resistor is serially connected in the motor circuit, for the purpose of deriving a feedback voltage which is directly dependent upon the field current. Many of the parts are similar to those shown in the parent application, and these are similarly numbered and their description will not be repeated. In this arrangement, however, a resistor 341 is connected in series with the motor between conductor 3 and a junction point which comprises the armature terminal 342; the armature 6 is connected from junction point 342 to common point 7 and thence through the serially connected field winding 5 to conductor 4, thus forming a series motor circuit traceable through 341, 342, 6, 7 and 5. Also in this arrangement the potential divider 10 is connected across only the portion of the series motor circuit comprising resistor 341, junction point 342, and armature 6, by connecting said potential divider from conductor 3 to common point 7. Furthermore, the control terminal 8 is connected through conductor 12 to the junction point 342.

In operation, a feedback voltage is developed across series resistor 341 which is directly proportional to the field current. The system operates in a manner generally similar to that described in the parent application, so that the output of the converter 1 is continuously regulated so as to maintain only a small difference of potential between terminals 8 and 9, and therefore between the junction point 342 and the tapping point 11. Accordingly, the output of the converter will always be such that the ratio of armature voltage to the voltage drop in series resistor 341 is maintained substantially equal to the ratio of the resistances of portions 343A and 343 of potential divider 10. Since the field current is directly proportion to the voltage drop in series resistor 341, the armature voltage will be maintained at all times proportional to the field current. This is equivalent to maintaining a constant ratio of armature voltage to field voltage under steady-state conditions and accordingly the motor will run at a substantially constant speed regardless of its load, according to the calculations on pages 6 and 7 of the parent specification, neglecting the effects of magnetic saturation.

Usually, the inductance of a motor armature is relatively small in comparison to that of the field, so that any transient voltages across the converter output conductors 3 and 4 are filtered out to a considerable extent by field winding 5, so that large transient voltages are not applied either to the potential divider 10 or to the motor armature 6 and series resistor 341; accordingly, the balance between the potentials at the tapping point 11 and the junction point 342 is not seriously disturbed by such transients, and the operation of the motor is generally more stable. Furthermore, in Fig. 1, when the converter 1 comprises a half-wave grid-controlled rectifier having a large ripple content in its output voltage, the field winding 5 performs the useful function of filtering out a large part of said ripple voltage before it is applied to potential divider 10, thus reducing to a considerable extent the ripple voltage which is applied to the control terminals 8 and 9.

Figure 2:
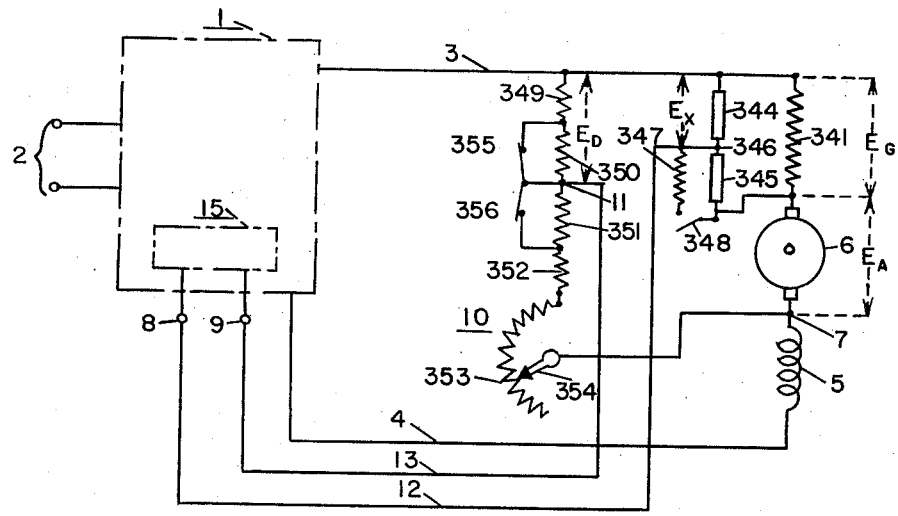
Figure 2 illustrates schematically a modification of the arrangement shown in Figure 1, including additional means for deriving the preferred control characteristics.

Fig. 2 shows an alternative arrangement, which also uses a series resistor 341 in the motor circuit and which illustrates means for compensating for the effects of magnetic saturation over two alternative speed ranges. Many of the parts are similar to those of Fig. 1 and are accordingly similarly numbered and their description is not repeated. In this arrangement two resistive elements 344 and 345 are connected in series with each other across the resistor 341, through an intermediate point 346. At least one of the resistive elements 344, 345 has a high voltage coefficient. Preferably the resistive element 344 has a high negative voltage coefficient such as is obtained with materials having the trade name "Thyrite," while the resistive element 345 may be a conventional linear resistor; alternatively, the resistive element 345 may have a high positive voltage coefficient such as is obtainable with a tungsten filament lamp, while the resistive element 344 may be a conventional linear resistor.

The feedback voltage $E_x$ is tapped across resistive element 344 only, and the voltage coefficients and values of resistive elements 344 and 345 are chosen so that said feedback voltage $E_x$ is, at all loads, approximately proportional to the motor field flux, so that the motor speed will remain constant with varying load, regardless of magnetic saturation; such compensation for magnetic saturation has been described in the parent specification.

The symbols $E_x$, $E_d$, and $E_A$ in Fig. 2 are equivalent to the same symbols in the parent specification. In Fig. 2, $E_G$ denotes the voltage drop across resistor 341 which is proportionate to its current and is therefore approximately proportional to the field current (since the current which is by-passed by potential divider 10 is comparatively small). The symbol $E_G$ in Fig. 2 is generally equivalent to the symbol $E_F$ in the parent specification.

It has been found that with some motors, less compensation for magnetic saturation is required at low speeds than at high speeds. Accordingly, in Fig. 2 a resistor 347 may be connected in parallel with resistive element 345 by means of the switch 348. Assuming that resistive element 344 is of the non-linear "Thyrite" type, and that resistive element 345 is a linear resistor, the effect of connecting resistor 347 is to make the voltage drop $E_x$ in the resistive element 344 more nearly proportional to the voltage $E_F$ derived from resistor 341, or in other words to decrease the amount of curvilinear compensation for magnetic saturation.

However, the connection of resistor 347 across resistive element 345 by means of switch 348 will also have the effect of increasing the feedback voltage $E_x$ and this will in turn cause an increase in the converter output and a corresponding increase in the motor speed. However, it is desirable that the motor speed should be reduced instead of increased when resistor 347 is connected, since it is only at reduced speeds that reduction in curvilinear compensation is required. Accordingly, in Fig. 2, the potential divider 10 is subdivided and provided with switches to obtain an optional control over a lower range of speeds at the same time that the resistor 347 is connected. The potential divider 10 comprises resistors 349 and 350 which are serially connected between conductor 3 and the tapping point 11; additional resistors 351 and 352 are serially connected between the tapping point 11 and the rheostat 353 which is provided with the slider arm 354; switches 355 and 356 are connected respectively across resistors 350 and 351 and the arrangement is such that switches 355 and 356 are closed when switch 348 is opened, and vice versa. When switches 355 and 356 are closed and switch 348 is open, the motor can be operated over a range of high speeds, since the ohmic value of resistor 349 is quite low in comparison with the ohmic value of rheostat 353; thus when rheostat 353 is increased towards its maximum resistance, the converter output is automatically regulated so that the armature voltage $E_a$ is very large in comparison with the feedback voltage $E_x$, thus resulting in a high motor speed. Alternatively, by opening switches 355 and 356 and simultaneously closing switch 348 the motor may be operated over a range of lower speeds; under these conditions the resistor 350 is included in series with resistor 349 so as to obtain an ohmic value of resistance which is no longer very small in comparison with the ohmic value of the rheostat 353; accordingly, even when rheostat 353 is adjusted to its maximum position, the armature voltage will not be very much greater than the voltage $E_d$ or the feedback voltage $E_x$, and the motor will run at a comparatively low speed. Resistors 351 and 352 are provided to obtain predetermined minimum speeds when the rheostat 353 is adjusted to zero resistance in either of the two alternative speed ranges: in the high speed range, when switches 356 and 355 are closed, the minimum speed is determined by the ohmic value of resistor 352 in relation to resistor 349; in the low speed range, when switches 356 and 355 are open, the minimum speed is determined by the sum of ohmic values of the resistors 351 and 352, in relation to the sum of the ohmic values of resistors 349 and 350.

Figure 3:
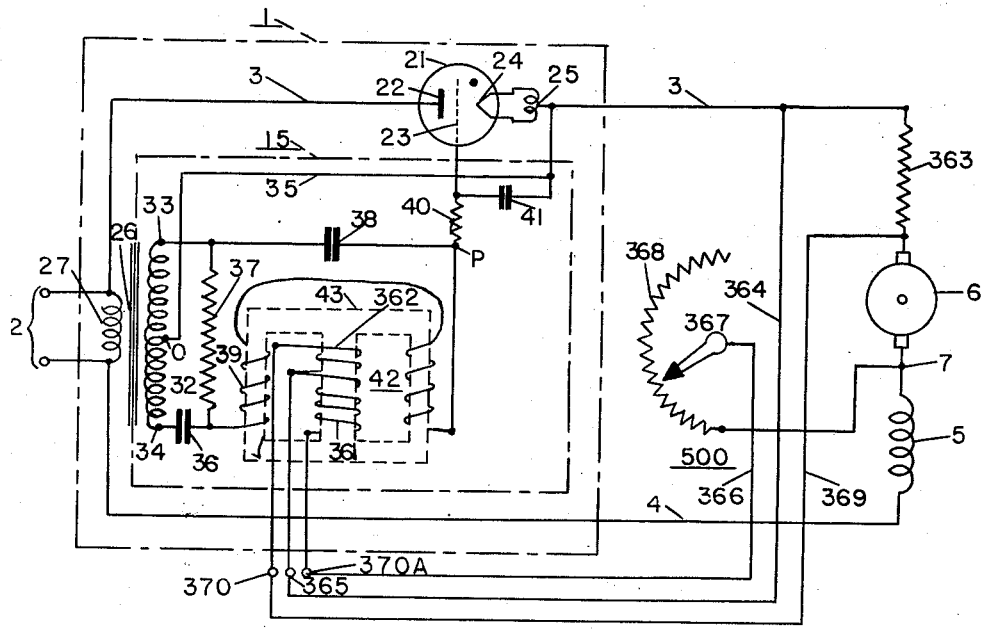
Figure 3 illustrates in detail an alternative arrangement.

Fig. 3 shows an alternative arrangement, in which the converter output is controlled by the difference between a quantity which is dependent upon the motor armature voltage and a second quantity which is depndent upon the motor current. Many of the parts are similar to those previously described with reference to the parent specification, and their description will not be repeated here. In Fig. 3, however, the converter output is controlled by the difference between asymmetric magnetomotive forces which are produced in core 43 of the saturable reactor 42 by means of the windings 361 and 362. The winding 361 constitutes a "voltage-sensitive element" since it forms a part of a voltage measuring circuit 500 which is connected across the motor armature 6 and series resistor 363; starting at conductor 3, the voltage measuring circuit 500 may be traced through conductor 364, terminal 365, winding 361, control terminal 370A, conductor 366, slider 367 and rheostat 368 to point 7 at the lower end of the armature. The "current-sensitive element" comprises the winding 362 which is connected in parallel with the resistor 363 by means of terminals 365, 370 and conductors 364, 369. In operation, the "voltage-sensitive" winding 361 produces an asymmetric magnetomotive force in the core 43 which is dependent upon the voltage across the motor armature 6 and the relatively small voltage across the series resistor 363, and which is therefore primarily dependent upon the armature voltage. At the same time, an asymmetric magnetomotive force is produced in the opposite direction in core 43 by means of winding 362, and this M. M. F. is dependent upon the motor current which flows through winding 362 and resistor 363 in parallel; the winding 362 comprises a relatively small number of turns of thick wire in contrast with winding 361 which comprises a relatively large number of turns of thin wire. The arrangement will adjust itself so that the converter delivers sufficient output to maintain an asymmetric M. M. F. from the voltage-sensitive winding 361, which is slightly smaller than the opposing asymmetric M. M. F. from the current-sensitive winding 362, so as to develop a resultant asymmetric M. M. F. which is equal to the difference between the two magnetomotive forces, which resultant M. M. F. controls the output of the converter. However, since the phase shifting network described in the parent application is extremely sensitive, only a small resultant asymmetric M. M. F. is required, and the two opposing asymmetric magnetomotive forces will therefore be substantially equal in value, and therefore the motor armature voltage will be substantially proportional to the motor current, as already described in the parent specification, this will result in a motor speed which is substantially independent of load, neglecting the effect of magnetic saturation in the motor; furthermore, the speed may be adjusted by moving the slider 367 which alters the ratio of the total motor armature voltage to the voltage across the winding 361.

Figure 4:
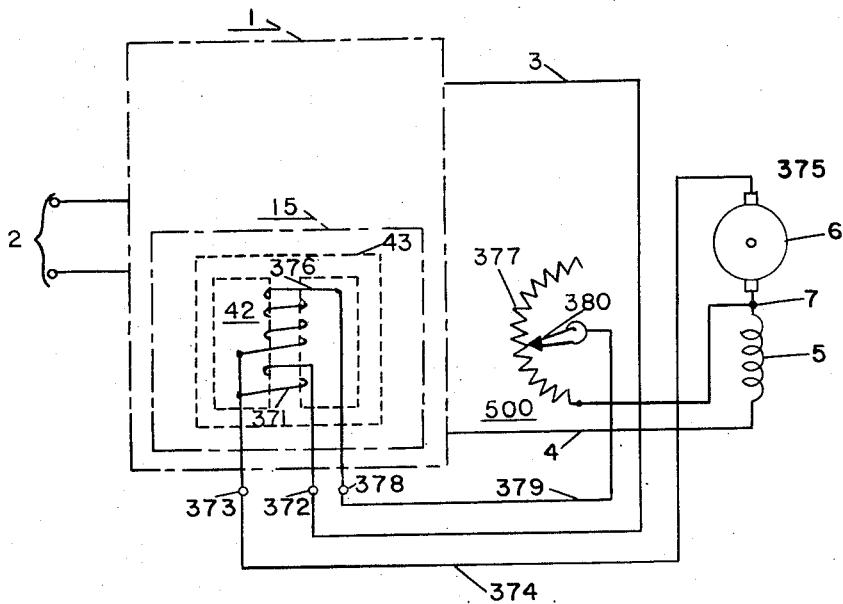
Figure 4 illustrates a modification based on Figure 3.

Fig. 4 shows an alternative arrangement in which many of parts are common to that of Fig. 3, and these parts have been similarly numbered and their description will not be repeated. In Fig. 4, however, the current-sensitive winding 371 is connected directly in series with the armature 6; its path may be traced from conductor 3 through terminal 372, winding 371, terminal 373, and conductor 374 to the upper terminal 375 of armature 6. Furthermore, the voltage-sensitive winding 376 is connected in series with rheostat 377 to form the voltage measuring circuit 500 which is connected directly across the armature 6 alone; the path of voltage measuring circuit 500 may be followed from armature terminal 375 through conductor 374, terminal 373, winding 376, terminal 378, conductor 379, slider 380, and rheostat 377 to armature terminal 7. Accordingly, the current flowing through the current-sensitive winding 371 is equal to the total motor field current, and therefore winding 371 is suitably wound with a small number of turns of thick wire; it produces an asymmetric M. M. F. in core 43 which is directly proportional to the motor field current. On the other hand, the voltage-sensitive winding 376 is wound with a large number of turns of thin wire and, since it is connected in series with rheostat 377 across the armature 6, it produces an opposing asymmetric M. M. F. in core 43 which is directly proportional to the motor armature voltage. The saturable reactor 42 preferably forms a part of the sensitive phase shifting circuit which is shown in detail in Fig. 3, and accordingly, the output of the converter 1 is always maintained at such a value that the opposing asymmetric magnetomotive forces developed by the windings 371 and 376 are approximately equal, so that a constant ratio of armature voltage to field current is maintained regardless of the motor load; as previously explained, this results in a constant motor speed, neglecting the effects of magnetic saturation.

Figure 5:
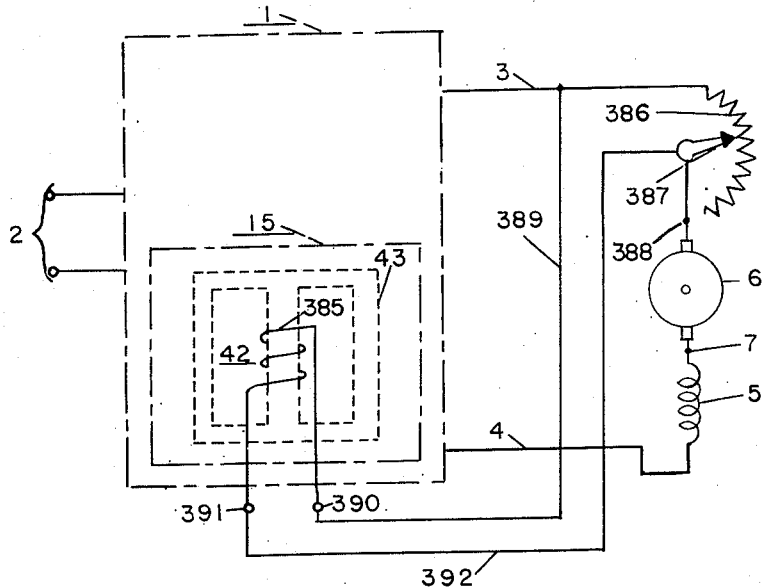
Figure 5 illustrates a further modification.

Fig. 5 shows an alternative arrangement in which many of the parts are similar to those of Fig. 3 and those parts are similarly numbered and their description will not be repeated. In Fig. 5, however, a current-sensitive winding 385 is connected across a series resistor 386, the ohmic value of which can be adjusted by means of slider 387; the resistor 386 is thus serially connected between conductor 3 and motor armature terminal 388. The path through the current-sensitive winding can be traced from conductor 3 through conductor 389, terminal 390, winding 385, terminal 391, and conductor 392 to the slider 387 and the armature terminal 388. In this arrangement, the "voltage-sensitive" winding 361 of Fig. 3 is omitted, and the arrangement operates on the following principle. The winding 385 produces an asymmetric M. M. F. in the core 43 which is dependent upon the voltage drop in the resistor 386 and therefore upon the motor current and in particular upon the motor field current. The resistor 386 is of such a low value that only a small proportion of current passes through the winding 385, so that when the motor is operating at full load, the winding 385 is only producing sufficient asymmetric M. M. F. to develop the output which is required from the converter 1 to drive the motor at full load at the desired speed. If the motor load is reduced so that its current decreases, the asymmetric M. M. F. developed by winding 385 similarly decreases and reduces the converter output; by careful design of the control device 15, which may for instance take the form of the phase shifting circuit described in detail in Fig. 3, it is theoretically possible to provide that the output of the converter varies in accordance with the motor current to the extent required to maintain an approximately constant motor speed, regardless of load, neglecting the effects of magnetic saturation. The actual operating speed of the motor can be adjusted by moving the slider 387; adjustment of the slider to increase the ohmic value of resistor 386 will create an increase in the asymmetric M. M. F. developed by winding 385 and hence an increase in the converter output voltage for a given condition of motor load and current, thus resulting in an increase in the motor speed; similarly a decrease in the ohmic value of resistor 386 will create a decrease in motor speed.

Figure 6:
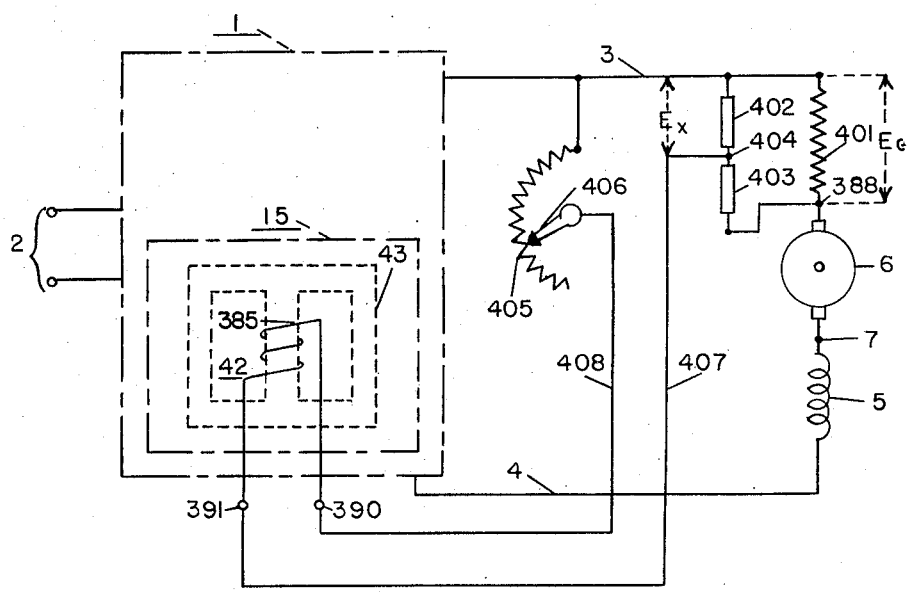
Figure 6 illustrates another modification.

Fig. 6 illustrates an alternative arrangement in which many of the parts are similar to those of Fig. 5, and those parts are similarly numbered and their description will not be repeated. In Fig. 6, however, the effects of magnetic saturation in the motor are compensated by means of resistive elements having different voltage coefficients of resistance. The resistor 401 is connected in series with the motor armature 6 and field winding 5, and the resistive elements 402 and 403 are serially connected, through intermediate point 404, across resistor 401; resistive elements 402 and 403 have different voltage coefficients of resistance, such that the ratio of voltage $E_x$ to the total voltage $E_G$ across resistor 401 varies approximately as the ratio of the motor field flux to the current in the motor field winding 5. Accordingly, the voltage $E_x$ varies approximately in direct proportion to the field flux. The voltage $E_x$ is applied to the current-sensitive control winding 385, through the serially connected rheostat 405, which is adjustable by means of slider 406; the path of the control circuit may be traced from intermediate point 404 through conductor 407, terminal 391, control winding 385, terminal 390, conductor 408, slider 406 and rheostat 405, to conductor 3. The control device 15 is preferably arranged so that the output voltage of converter 1 is approximately proportional to the current flowing between the control terminals 390, 391; if it is found impracticable to retain the desired degree of proportionality, the non-linear resistive elements 402 and 403 may be selected so that the output voltage of the converter is nevertheless approximately proportional to the motor field flux; accordingly the motor will run at a substantially constant speed, regardless of its magnetic saturation. The ratio of the converter output voltage to the motor field flux may be adjusted by varying the position of slider 406 or rheostat 405, and this accordingly provides an adjustment of the motor speed.

Figure 7:
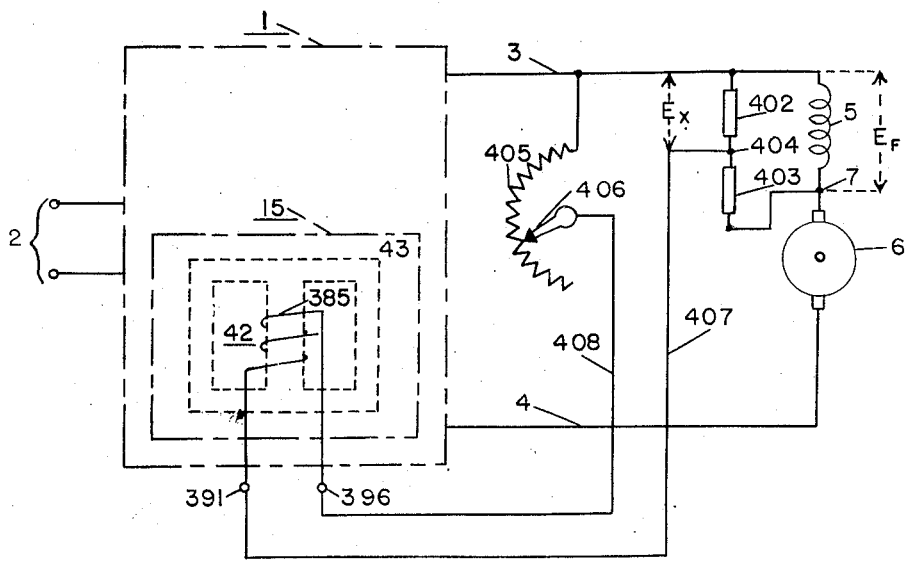
Figure 7 illustrates a modification based on Figure 6.

Fig. 7 shows an alternative arrangement in which many of the parts are similar to those of Fig. 6, and those parts are similarly numbered so that their description will not be repeated. In Fig. 7, however, the serially connected non-linear resistive elements 402 and 403 are connected across the field winding 5, instead of across a series resistor. The resistive elements 402 and 403 are selected so that $E_x$ varies less rapidly than the field voltage $E_F$, and so that the output voltage of converter 1 is approximately proportional to the field flux which is created by the current corresponding to the field voltage $E_F$. Accordingly, the motor will tend to run at a constant speed regardless of its load, and the speed may be adjusted by varying the position of slider 406 on rheostat 405.

Fig. 8 shows an alternative arrangement to that shown in Fig. 2. Many of the parts are similar to those of Fig. 2 and are accordingly similarly numbered and their description will not be repeated; Fig. 8 has been simplified for purposes of description by omitting the resistors 347, 350, 351 and the switches 348, 355 and 356 and thus omitting one of the two alternative speed ranges of the arrangement shown in Fig. 2, but it should be understood that said resistors and switches may be included in the Fig. 8 arrangement if two alternative speed ranges are desired.

Fig. 8 differs from Fig. 2 inasmuch as the resistive elements 344 are respectively interchanged, and the potential divider 10 is connected only across the resistive element 344 and the armature 6. The path of the potential divider 10 may be traced from the intermediate point 346 (between resistive elements 345 and 344), through resistor 349, tapping point 11, resistor 352, rheostat 353 and slider 354 to common point 7 (between the armature 6 and the field 5). The resistive element 344 has a voltage coefficient of resistance which is highly negative with respect to the voltage coefficient of the resistive element 345; for instance, the resistive element 344 may be of a material having the trade name "Thyrite," which the resistive element 345 may be a conventional linear resistor. The feedback voltage $E_x$ is tapped across resistive element 344 only, and the voltage coefficients and values of resistive elements 344 and 345 are chosen so that said feedback voltage $E_x$ is, at all loads, approximately proportional to the motor field flux, so that the motor speed will remain substantially constant with varying load, regardless of magnetic saturation, in a manner similar to that which has been described in the parent specification. However, the arrangement of Fig. 8 will keep the motor speed even more constant, especially at low speeds, since its tendency is to maintain a constant ratio of armature voltage $E_a$ to field flux (which is proportional to $E_x$ rather than maintaining a constant ratio of the total voltage ($E_aE_g$) to the field flux as was the case in Fig. 2. This will become apparent from a consideration of the voltages in Fig. 8, on the assumption that the control device 15 is so sensitive that it is only necessary to apply a negligible signal voltage between terminals 8 and 9 through conductors 12 and 13 from the junction point 342 and the tapping point 11. On this assumption, the potentials at tapping point 11 and junction point 342 are substantially equal and a bridge balance of voltage is obtained such that $$\frac{E_a}{E_x} = \frac{E_c}{E_d}$$

On the further assumption that $E_x$ is proportional to the motor field flux, it will be seen that the ratio of armature voltage to field flux is therefore maintained at a constant value which is dependent upon the ratio $$\frac{E_c}{E_d}$$

and accordingly the motor speed is theoretically constant.

Fig. 9 is an alternative arrangement to that shown in Fig. 1 and many of the parts are similar to those shown in Fig. 1 and these are similarly numbered and their description will not be repeated. In Fig. 9, however, a resistive element 411 having a high negative voltage coefficient of resistance, for instance of the material having the trade name "Thyrite," is connected in series with the motor between conductor 3 and the junction point comprising the armature terminal 342. On account of the negative voltage coefficient of the resistive element 411, the feedback voltage $E_x$ derived from it will increase less rapidly than the current in the motor field winding 5 and this will tend to compensate for the effect of magnetic saturation as described in the parent specification. It may, however, overcompensate for the magnetic saturation effect, in which case a linear resistor 412 may be connected in parallel with resistive element 411, by means of terminals 413, 414 and lugs 415, 416; said resistor 412 moderates the degree of curvilinear compensation for magnetic saturation and its ohmic value may be selected or adjusted to give the desired degree of compensation.

What is claimed is:

1. A variable speed electric drive comprising: a controllable electric converter having at least two output terminals and a control device; a motor circuit comprising a field winding, an armature winding and a current-sensitive element connected in series with said armature and field windings between said two output terminals; and means for coupling said current sensitive element to said control device whereby the output of said converter is available in accordance with the current in said motor circuit; and in which the current sensitive element includes a pair of serially connected resistive elements having different voltage coefficients of resistance and a circuit including a control winding, said circuit being connected across one of said resistive elements, whereby the motor speed is compensated for the effects of magnetic saturation in the motor.

2. A variable speed electric drive comprising: a controllable electric power converter having a first and a second output terminal, and a first and a second control terminal; a serially connected electric motor circuit comprising at least one series field winding connected between said first output terminal and a common point, an armature winding connected between said common point and a junction point, and a series resistor connected between said junction point and said second output terminal; a first and a second resistive element having different voltage coefficients of resistance and serially connected, through an intermediate point, across said series resistor; a potential divider connected across said serially connected armature and series resistor and having a tapping point thereon; a connection from said tapping point to said first control terminal; and a connection from said intermediate point to said second control terminal.

3. A variable speed electric drive comprising: a controllable electric power converter having a first and a second output terminal, and a first and second control terminal; a serially connected electric motor circuit comprising at least one series field winding connected between said first output terminal and a common point, an armature winding connected between said common point and a junction point, and a series resistor connected between said junction point and said second output terminal; a first and a second resistive elements having different voltage coefficients of resistance and serially connected, through an intermediate point, across said series resistor; a potential divider connected between said intermediate point and said common point and having a tapping point thereon; a connection from said tapping point to said first control terminal; and a connection from said junction point to said second control terminal.

4. A variable speed electric drive comprising: a controllable electric converter having a first and a second output terminal and a first and a second control terminal; an electric motor circuit including a main field winding and an armature winding and a resistive circuit all connected in series across said output terminals; a potential divider, including a tapping point, connected electrically in parallel with at least the armature portion of said motor circuit; means connecting said tapping point to one of said control terminals; and connection means connecting the other of said control terminals to a given point on said motor circuit where the voltage between said given point and said second output terminal is dependent only on the motor current; and in which at least part of said resistive circuit comprises a resistive element having a negative voltage coefficient of resistance.

5. A control system for a series-wound electric motor circuit having an armature and at least one serially connected field winding comprising: a controllable electric converter having a first and a second output terminal and a first and a second control terminal; a series resistor connected between said second output terminal and a junction point, said armature being connected between said junction point and a common point, and said field winding being connected between said common point and said first output terminal; a potential divider connected between said common point and said second output terminal and having a tapping point thereon; a direct connection from said tapping point to said first control terminal; and a direct connection from said junction point to said second control terminal.

6. A control system for a series-wound electric motor circuit having an armature and at least one serially connected field winding comprising: a controllable electric power converter having a first and second output terminal, and a first and second control terminal, at least one of said series field windings being connected between said first output terminal and a common point, and said armature winding being connected between said common point and a junction point; a series resistor connected between said junction point and said second output terminal; first and second resistive elements having different voltage coefficients of resistance and serially connected, through an intermediate point, across said series resistor; a potential divider connected across said serially connected armature and series resistor and having a tapping point thereon; a connection from said tapping point to said first control terminal; and a connection from said intermediate point to said control terminal.

7. A control system for a series-wound electric motor circuit having an armature and at least one serially connected field winding comprising: a controllable electric converter having a first and a second output terminal and a first and a second control terminal; a series impedance connected between said second output terminal and a junction point, said armature being connected between said junction point and a common point, and said field winding being connected between said common point and said first output terminal; a variable resistor having a tapped point thereon and being connected between the common point and a point on said impedance; a connection from said tapping point to said first control terminal; and a connection from said junction point to said second control terminal.

8. The combination of claim 7 in which said impedance is a resistor.

9. The combination of claim 7 in which said impedance includes a control winding of said controllable converter.

10. The combination of claim 7 in which said impedance includes a first control winding of said controllable converter and in which said variable resistor is connected in series with a second control winding of said controllable converter.

11. The combination of claim 7 wherein the variable resistor includes a fixed resistance portion whereby the minimum resistance value and therefore the minimum output of the converter are predetermined in value.

12. A variable speed electric drive comprising: a series-wound electric motor circuit having an armature and at least one serially connected field winding; a controllable electric converter having a first and a second output terminal and a first and a second control terminal; a series impedance connected between said second output terminal and a junction point, said armature being connected between said junction point and a common point, and said field winding being connected between said common point and said first output terminal; a variable resistor connected between said common point and a point on said impedance and having a tapping point thereon; a connection from said tapping point to said first control terminal; and a connection from said junction point to said second control terminal.

References Cited in the file of this patent

UNITED STATES PATENTS

| | | |
|---|---|---|
| 2,546,014 | Puchlowski et al. | Mar. 20, 1951 |
| 2,558,086 | Herchenroeder | June 26, 1951 |
| 2,558,094 | King | June 26, 1951 |
| 2,600,303 | Kovalsky | June 10, 1952 |